United States Patent Office 3,752,892
Patented Aug. 14, 1973

3,752,892
ANOREXIGENIC TETRAHYDROBENZAZEPINE DERIVATIVE, METHOD AND COMPOSITION THEREOF
Karl Hoegerle, Basel, and Ernst Habicht, Oberwil, Switzerland, assignors to Ciba-Geigy Corporation, Ardsley, N.Y.
No Drawing. Original application Aug. 9, 1968, Ser. No. 751,380, now abandoned. Divided and this application Mar. 11, 1970, Ser. No. 23,526
The portion of the term of the patent subsequent to Feb. 13, 1990, has been disclaimed
Int. Cl. A61k 27/00
U.S. Cl. 424—244
2 Claims

ABSTRACT OF THE DISCLOSURE 6-chloro-2,3,4,5-tetrahydro-H-3-benzazepine and pharmaceutically acceptable acid addition salts thereof are prepared; pharmaceutical compositions containing said compounds and a method of producing an anorexigenic effect in a mammal are provided.

CROSS-REFERENCE TO RELATED APPLICATIONS

This application is a divisional of Ser. No. 751,380, filed Aug. 9, 1968, now abandoned.

DETAILED DESCRIPTION

The present invention concerns a tetrahydrobenazepine derivative and its pharmaceutically acceptable acid addition salts, a process for the production of this base, pharmaceutical compositions containing the latter and a method of producing an anorexigenic effect in a mammal.

More particular, the present invention pertains to 6-chloro-2,3,4,5-tetrahydro-1H-3-benzazepine of Formula I

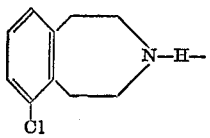

and pharmaceutically acceptable acid addition salts thereof, which compounds possess valuable pharmacological properties especially anorexigenic activity.

6-chloro - 2,3,4,5 - tetrahydro-1H-3-benzazepine and its acid addition salts are produced in accordance with the invention, by reacting chlorine with 2,3,4,5-tetrahydro-1H-3-benzazepine under normal standard conditions for the chlorination of aromatic rings, separating the desired 6-chloro-2,3,4,5-tetrahydro-1H-3-benzazepine directly or after conversion into an addition salt with an inorganic or organic acid, and if desired, converting the base or the initially obtained acid addition salt into another acid addition salt.

The chlorination according to the invention is carried out, for example, in the presence of catalysts such as aluminum chloride, zinc chloride, iron (III)-chloride, iron wire turnings or iodine in the presence or absence of solvents such as, for example, nitrobenzene or glacial acetic acid. The chlorination is performed for example at temperatures between 10 and 120° C. It is particularly suitable to effect chlorination by using a reaction mixture of aluminum chloride and 2,3,4,5-tetrahydro-1H-3-benzazepine, obtained in the manner given in more detail below, at elevated temperatures, preferably between 70 and 100° C.

The 6-chloro-2,3,4,5-tetrahydro-1H-benzazepine is separated from the crude chlorination products for example by fractional crystallisation of one of its salts, i.e. the hydrochloride, from suitable organic solvents or solvent mixtures, such as for example ethanol or ethanol/ethylacetate.

The 2,3,4,5-tetrahydro-1H-3-benzazepine used as the starting material is known and can be produced using various processes. It is particularly advantageous, however, to produce it using a process hitherto unknown. Compounds of the Formula II

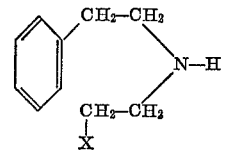

wherein

X represents halogen, preferably chlorine or bromine, or addition salts of these compounds with inorganic or organic acids can surprisingly be condensed by means of Lewis acids to obtain 2,3,4,5-tetrahydro-1H-3-benzazepine.

Lewis acids suitable for the above process are for example: antimony(V)-chloride, iron(III)-chloride, tellurium(II)-chloride, tin(IV)-chloride, titanium(IV)-chloride, tellurium(IV)-chloride, bismuth(III)-chloride, zinc chloride and particularly aluminum chloride, as well as corresponding bromides and iodides, also borotrifluoride or borotrichloride, hydrogen fluoride, sulphuric acid, phosphorus pentoxide or polyphosphoric acid. The Lewis acid is usually added to the extent of 0.05–5 mol percent, preferably 1–1.5 mol percent, to the reaction mixture. The reaction temperatures with the Lewis acid are between 100 and 300°, preferably between 150 and 250°.

The 2,3,4,5-tetrahydro - 1H - 3-benzazepine formed is then isolated by addition of a base, preferably an inorganic base, e.g. an alkali hydroxide, such as sodium or potassium hydroxide, to the reaction mixture.

In general, the reaction of a compound of the Formula II with a Lewis acid does not require a solvent or diluent. If desired, however, it is possible to use as such for example, a nitrohydrocarbon, such as nitrobenzene, or a halogen hydrocarbon, such as ethylene chloride or o-dichlorobenzene.

The Friedel-Crafts catalysts, which are preferably used as Lewis acids, in particular aluminum chloride, are also suitable catalysts for the chlorination of aromatic rings in aromatic compounds with aliphatic side chains or fused saturated rings. Optionally it is therefore possible to eliminate the step of isolating the 2,3,4,5-tetrahydro-1H-3-benzazepine and, in accordance with a particularly advantageous method of application of the process according to the invention, to use directly the reaction mixtures obtained after ring closure of the compounds of the Formula II, to prepare 2,3,4,5-tetrahydro-1H-3-benzazepine, using Friedel-Crafts catalysts, particularly aluminum chloride. In this case, the previously mentioned isolation of the ring closure product resulting from the addition of a base to the reaction mixture, occurs only following chlorination acording to the invention.

The N-(2-chloroethyl)-phenethylamine-hydrochloride, an addition salt of a compound of the Formula II, can for example be produced as follows: by reacting styrene in the presence of sodium with ethylene imine, to form 1-phenethyl-aziridine and adding hydrogen chloride to this aziridine, which is dissolved in methanol. The remaining compounds of the Formula II can be produced in an analogous manner.

The 6-chloro-2,3,4,5-tetrahydro-1H-3-benzazepine obtained by chlorination according to the invention, is converted either directly as the crude product into a salt, in particular hydrochloride, suitable for fractional crystallisation, or else it is firstly purified by methods known in the art and subsequently converted into an addition salt with an inorganic or organic acid. For example, a solution of 6-chloro-2,3,4,5-tetrahydro-1H-3-benzazepine in an organic solvent is mixed with the acid which is desired as the salt constituent, or with a solution of this acid. Preferably, organic solvents are chosen for the reaction, in which the desired salt is not readily soluble, so that it can be separated off by filtration. Such solvents are for example methanol, acetone, methylethyl ketone, acetone/ethanol, methanol/ether or ethanol/ether.

In order subsequently, to transform an acid addition salt into another, either the base is firstly liberated and converted as above into another salt, or the salt is reacted directly with another acid or a salt thereof in a suitable medium, in which it is more readily soluble than the salt desired.

For application as medicaments, a pharmaceutically acceptable acid addition salt may be used instead of the free base, e.g. salts with acids, whose anions are not toxic at the required dosage. It is moreover advantageous, if the salts to be used as medicaments are easily crystallizable and are not, or are only slightly, hygroscopic. For forming a salt with 6-chloro-2,3,4,5-tetrahydro-1H-3-benzazepine, it is possible to use for example hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid.

6-chloro-2,3,4,5-tetrahydro-1H-3-benzazepine and the acid addition salts thereof have been found to have valuable pharmacological properties, especially anorexigenic activity combined with a low order of toxicity. These favourable properties render the compounds of the invention well suited for the treatment of obesity.

The anorexigenic effects of the compounds of the invention are illustratively demonstrated according to the method of Spengler and Waser, Helv. Physiol. Pharmac. Acta 15, 444–449 (1957) in rats trained to consume food during day-time. Thus it is shown that 6-chloro-2,3,4,5-tetrahydro-1H-3-benzazepine hydrochloride on oral administration in amounts of about 10 mg./kg. inhibits food consumed to a very significant extent.

The acute toxicity of 6-chloro-2,3,4,5-tetrahydro-1H-3-benzazepine hydrochloride as demonstrated in rats and mice per os is of low order.

For their intended use the compounds of the invention are administered orally, rectally or particularly in the form of aqueous solutions of the acid addition salts, also parenterally, in amounts depending on the species, age and weight of the subject under treatment as well as on the particular condition to be treated and the mode of administration.

In general the daily dosages of the compounds of the invention vary between about 0.3 and 10 mg./kg. of bodyweight on oral administration.

For administration purposes pharmaceutical compositions are prepared containing the compound of Formula I and for at least one pharmaceutically acceptable acid addition salt thereof, an inert pharmaceutical carrier and, if desired, other additives. These compositions are presented for oral, rectal or parenteral administration in dosage units, such as tablets, dragees, capsules, suppositories or ampoules, which preferably contain as active ingredient 5–50 mg. of a compound of the invention.

Dosage units for oral administration preferably contain as active substance between 1–90% of 6-chloro-2,3,4,5-tetrahydro-1H-3-benzazepine or a pharmaceutically acceptable salt thereof. They are produced by combining the active substance with, e.g. solid pulverulent carriers, such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragee cores. The latter are coated, e.g. with concentrated sugar solutions, which can also contain e.g. gum arabic, talcum and/or titanium dioxide, or with a lacquer dissolved in easily volatile organic solvents or mixtures of solvents. Dyestuffs can be added to these coatings, e.g. to distinguish between various dosages of active substance.

Other suitable dosage units for oral administration are hard gelatine capsules, and also soft closed capsules made of gelatine and a softener such as glycerin. The hard gelatine capsules preferably contain the active substance as a granulate, e.g. in admixture with fillers, such as maize starch, and/or lubricants, such as talcum or magnesium stearate, and, optionally, stabilisers such as sodium metabisulphite ($Na_2S_2O_5$) or ascorbic acid. In soft capsules, the active substance is preferably dissolved in suitable liquids, such as liquid polyethylene glycols, whereby stabilisers can also be added.

Examples of dosage units for rectal administration are, e.g. suppositories comprising the active substance or a suitable salt thereof with a fatty base, or also gelatine rectal capsules, which contain a combination of the active substance or a suitable salt thereof, with polyethylene glycols.

Ampoules for parenteral, particularly intramuscular administration preferably contain a water soluble salt of the active substance in a concentration of, preferably, 0.5–5%, in aqueous solution, optionally together with suitable stabilisers and buffer substances.

The following examples further illustrate the production of the compounds of the invention as well as the production of pharmaceutical compositions consisting essentially of a compound of the invention.

Example 1

1105 g. of N-(2-chloroethyl)-phenethylamine hydrochloride (=5 mol) are mixed with 1000 g. of aluminum chloride (=7.5 mol), heated slowly whilst stirring to 180° (bath temperature) and held for 14 hours at this temperature. After this period of time the HCl evolution has finished.

The reaction mixture obtained, which contains the crude 2,3,4,5-tetrahydro-1H-3-benzazepine, is cooled to 80° and, over a period of 4 hours at 80°, 415 g. of chlorine gas (=5.8 mol) are introduced. The melt is poured still hot onto ice and stirred until solution has occurred. Whilst stirring and with slight cooling, 7000 ml. of 30% conc. sodium hydroxide solution are then added. The mixture is stirred at room temperature until the precipitated aluminum hydroxide has again completely dissolved. The solution is then extracted with 20 l. of ether in 4 portions, the combined ether solutions being dried over potassium carbonate/magnesium sulphate and the solution evaporated after filtering off the drying agent. Fractional distillation of the oily evaporation residue produces monochlorinated 2,3,4,5-tetrahydro-1H-3-benzazepine in the boiling range of 81–84°/0.08 torr and with a refractive index of $n_D^{20}$ 1.579–1.581 as the major fraction.

In further processing, 100 g. of the above major fraction are dissolved in 1000 ml. of abs. ether and the solution mixed with 200 ml. of absolute-ethereal 3 N hydrogen chloride solution.

The precipitated crude monochlorinated 2,3,4,5-tetrahydro-1H-3-benzazepine hydrogen chloride is filtered off and recrystallised firstly twice from ethanol/ethylacetate (1:2, then 1:1) and then four times from abs. ethanol (180, 150, 100 and 100 ml.). The desired 6-chloro-2,3,4,5-tetrahydro-1H - 3 - benzazepine hydrochloride of M.P. 216–217° is thereby obtained, the NMR-spectrum of which corresponds to the stated constitution.

The crude base is liberated from the mother liquor and distilled under high vacuum, kp. 69–72°/0.07 torr. The distillate in 500 ml. of abs. ether is mixed with the calculated quantity of 3 N hydrogen chloride solution in ether.

The crude hydrochloride obtained is again filtered off and recrystallised four times from abs. ethanol, whereby further 6-chloro-2,3,4,5-tetrahydro-1H-3-benzazepine hydrochloride is obtained of M.P. 214–215°.

Example 2

221 g. of N - (2 - chloroethyl)-phenethylamine hydrochloride (=1 mol) are mixed intimately with 200 g. of anhydrous aluminum chloride (=1.5 mol) and the mixture slowly heated to 170° (bath temperature), held for 6 hours at this temperature and heated for a further 8 hours at 180° (bath temperature).

After cooling to 90°, 85 g. of chlorine gas (=1.1 mol) are passed through the obtained reaction mixture containing the crude 2,3,4,5-tetrahydro-1H-3-benzazepine over a period of 2 hours at an internal temperature of 90–95°. The reaction mixture is then poured hot onto ice, stirred for 1½ hours at room temperature, until complete solution has occurred and then rendered alkaline by addition of 1000 ml. of 30% conc. sodium hydroxide solution. After the initially precipitated aluminum hydroxide has dissolved, the solution is extracted four times with 800 ml. of diethyl ether each time. The combined extracts are dried (potassium carbonate/magnesium sulphate) and evaporated to oily residue. Fractionation in high vacuum produces crude monochlorinated 2,3,4,5-tetrahydro-1H-3-benzazepine as the principal fraction, with a boiling range of about 75–85° at 0.02–0.08 torr. Refractive index $n_D^{20}$ about 1.579.

Preparation of the principal fraction is carried out completely analogously to Example 1.

Example 3

250 g. of 6-chloro-2,3,4,5-tetrahydro-1H-3-benzazepine hydrochloride are mixed with 175–80 g. of lactose and 169.70 g. of potato starch, the mixture being moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets, each weighing 100 mg. and containing 25 mg. of active substance, which, if desired, can be grooved for fined adjustment of the dosage.

Example 4

A granulate is produced from 250 g. of 6-chloro-2,3,4, 5-tetrahydro-1H-3-benzazepine hydrochloride, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and the mixture is pressed into 10,000 dragée cores. These are then coated with a concentrated syrup made from 502.28 g. of crystallised saccharose, 6 g. of shellac, 10 g. of gum arabic, 0.22 g. of dyestuff and 1.5 g. of titanium dioxide and dried. The obtained dragées each weigh 120 mg. and each contain 25 mg. of active substance.

What we claim is:

1. A method of producing an anorexigenic effect in a mammal suffering from obesity comprising administering to that mammal an anorexigenically effective amount of 6-chloro-2,3,4,5-tetrahydro - 1H - 3 - benzazepine and the pharmaceutically acceptable acid addition salts thereof.

2. A pharmaceutical composition consisting essentially of an anorexigenically effective amount of the compound of claim 1 or a pharmaceutically acceptable acid addition salt thereof and a solid pulverulent pharmaceutical carrier.

References Cited

UNITED STATES PATENTS

| 3,483,185 | 12/1969 | Tokolics et al. | 260—239 |
| 3,093,632 | 6/1963 | Mull | 260—239 |
| 3,314,963 | 4/1967 | Koch | 260—239 |

FOREIGN PATENTS

| 1,473,840 | 2/1967 | France | 260—239 |

STANLEY J. FRIEDMAN, Primary Examiner

U.S. Cl. X.R.

260—239 BB

PO-1050
(5/69)

UNITED STATES PATENT OFFICE
CERTIFICATE OF CORRECTION

Patent No. 3,752,892      Dated August 14, 1973

Inventor(s) KARL HOEGERLE ET AL

It is certified that error appears in the above-identified patent and that said Letters Patent are hereby corrected as shown below:

Column 1, after line 12, insert

-- Claims priority, application Switzerland,

February 9, 1968, 1976/68 --

Signed and sealed this 23rd day of April 1974.

(SEAL)
Attest:

EDWARD M. FLETCHER, JR.          C. MARSHALL DANN
Attesting Officer                Commissioner of Patents